US012493632B1

(12) United States Patent
Mortensen et al.

(10) Patent No.: US 12,493,632 B1
(45) Date of Patent: Dec. 9, 2025

(54) SYSTEMS AND METHODS FOR QUERYING HIERARCHICALLY-STRUCTURED DATA FROM A DATABASE

(71) Applicant: Veeva Systems Inc., Pleasanton, CA (US)

(72) Inventors: Marius K. Mortensen, Burlington (CA); Asaf Roll, Richmond Hill (CA); Justin Yuping Lai, Markham (CA); Yui To Wong, Toronto (CA)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/511,221

(22) Filed: Nov. 16, 2023

(51) Int. Cl.
*G06F 16/28* (2019.01)
*G06F 16/2455* (2019.01)

(52) U.S. Cl.
CPC ........ *G06F 16/282* (2019.01); *G06F 16/2455* (2019.01); *G06F 16/285* (2019.01)

(58) Field of Classification Search
CPC ... G06F 16/282; G06F 16/2455; G06F 16/285
See application file for complete search history.

(56) References Cited

U.S. PATENT DOCUMENTS 9,501,368 B2 * 11/2016 Beatty ................. G06F 11/1469
10,860,550 B1 * 12/2020 Chheda ................. G06F 16/213
11,321,342 B2 * 5/2022 Kuchnio ............... G06F 16/254
11,789,968 B2 * 10/2023 Kuchnio ............. G06F 16/2246 707/602
2016/0132643 A1 * 5/2016 Radhakrishna ........ G16H 70/60 705/3
2017/0300552 A1 * 10/2017 Mandadi ............... G06F 16/282
2022/0035828 A1 * 2/2022 Kuchnio ................. G06F 16/26
2022/0261414 A1 * 8/2022 Kuchnio ................. G06F 16/26
2023/0409592 A1 * 12/2023 Kuchnio ............. G06F 16/2246
2025/0077540 A1 * 3/2025 Kuchnio ............... G06F 16/254

OTHER PUBLICATIONS

Oracle, "Oracle Argus Safety—User Guide" Oct. 2020, Release 8.2.2, 206 pages printed (Year: 2020).

* cited by examiner

*Primary Examiner* — Kavita Stanley
*Assistant Examiner* — Cecile H Vo

(57) ABSTRACT

A method for querying hierarchical data from a first database including receiving first hierarchical data associated with a first version and storing the first hierarchical data in the first database of the provider computing system. The method includes receiving a request to generate a query set including a first query and a second query. The method includes generating the query set. The method includes receiving second hierarchical data associated with a second version and storing the second hierarchical data in the first database of the provider computing system. The method includes executing the query set on the database to select matching hierarchical data, in response to storing the second hierarchical data in the first database. The method includes selecting a datasheet including outmoded hierarchical data. The method includes replacing the outmoded hierarchical data with the matching hierarchical data and storing the datasheet in the second database.

16 Claims, 6 Drawing Sheets

SYSTEMS AND METHODS FOR QUERYING HIERARCHICALLY-STRUCTURED DATA FROM A DATABASE

TECHNICAL FIELD

The present disclosure relates to systems and methods for querying hierarchically-structured data from a database.

BACKGROUND

Researchers, scientists, industry players, academics, government regulators, and other stakeholders are increasingly in need of efficient and simple ways to search for and access hierarchically-structured data.

SUMMARY

One embodiment relates to a method for querying hierarchical data from a first database. The method includes receiving first hierarchical data associated with a first version and storing the first hierarchical data in the first database of the provider computing system. The method further includes receiving a request to generate a query set including a first query and a second query. The first query includes a first query type and the second query includes a second query type. The method further includes generating the query set including the first query and the second query set. The method further includes receiving second hierarchical data associated with a second version and storing the second hierarchical data in the first database of the provider computing system. The method further includes executing the query set on the database to select matching hierarchical data, in response to storing the second hierarchical data in the first database. The method further includes selecting a datasheet from a second database of the provider computing system. The datasheet includes outmoded hierarchical data. The method further includes replacing the outmoded hierarchical data of the datasheet with the matching hierarchical data and storing the datasheet including the matching hierarchical data in the second database.

Another embodiment relates to a method for querying hierarchical data from a first database. The method includes receiving first hierarchical data associated with a first version and storing the first hierarchical data in the first database of the provider computing system. The method further includes receiving a request to generate a query set including a first query and a second query. The first query includes a first query type and the second query includes a second query type. The method further includes generating the query set including the first query and the second query set. The method further includes receiving second hierarchical data associated with a second version and storing the second hierarchical data in the first database of the provider computing system. The method further includes receiving a request to update outmoded hierarchical data of a datasheet. The method further includes executing the query set on the database to select matching hierarchical data, in response to receiving the request. The method further includes selecting a datasheet from a second database of the provider computing system. The datasheet includes outmoded hierarchical data. The method further includes replacing the outmoded hierarchical data of the datasheet with the matching hierarchical data and storing the datasheet including the matching hierarchical data in the second database.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
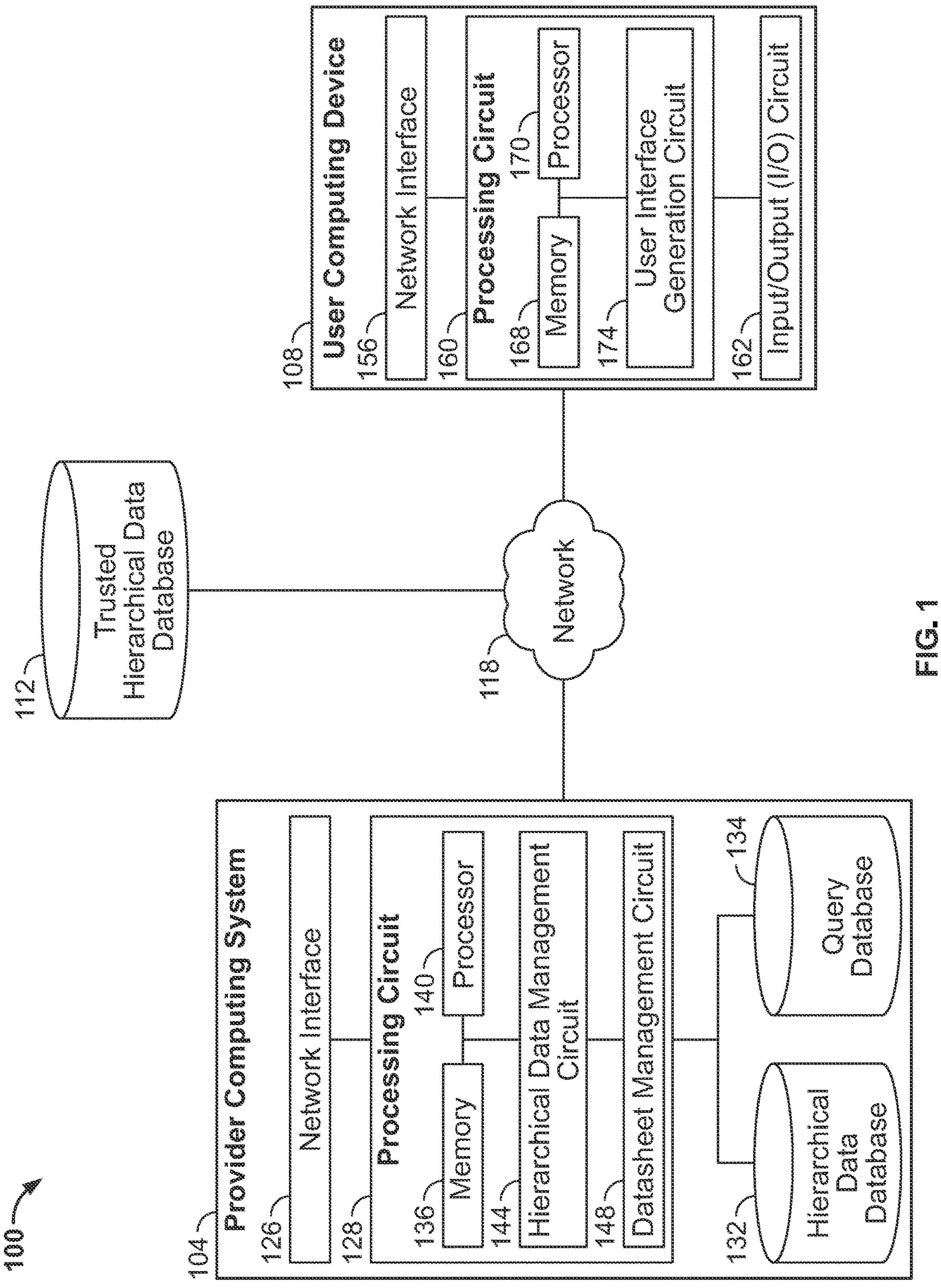
FIG. 1 may be component diagram of a hierarchical data system, according to an example embodiment.

Referring generally to the figures, systems and methods for querying hierarchically-structured data from a database. The systems and methods described herein provide for enhanced retrieval, storage, and querying of data by using hierarchical data structures that result in multiple technical improvements. For instance, because the present systems and methods utilize hierarchical data structures, the present systems and methods provide for more efficient data retrieval by reducing the number of comparisons or searches required to locate a specific term or piece of data, as compared to typical data storage and querying systems. For instance, by using hierarchically-structured data and query sets, the present systems and methods divide the data into small, more manageable segments which reduces the overall search space and allows for faster querying or identification of the desired data element, which saves on processing power. Likewise, by using hierarchically-structured data and query sets, the present systems and methods provide contextual clues (e.g., hierarchical classifications) that can guide the computing systems described herein during the querying process. For instance, by knowing the parent classification or hierarchical level, the systems and methods described herein, only need to look at a subset of the total hierarchical data, when performing a search/query, which can significantly reduce the number of pieces of data that need to be examined, thereby saving on processing power and cache memory.

Additionally, by utilizing hierarchically-structured data, the present systems and methods provide for reduced data redundancy and therefore require less memory and storage requirements than typical database systems. For instance, by using hierarchically-structured data and query sets, the present systems and methods facilitate data normalization by grouping similar data together (e.g., into hierarchical classifications) and eliminating redundant attributes or pieces of data. By doing so, the present systems and methods provide for the removal or elimination of duplicate data which significantly reduces storage requirements, thereby requiring less memory overall.

Additionally, the present systems and methods may provide for a technical improvement to medical coding systems by utilizing revision control when receiving a new version of the hierarchical data and for pushing the new version of the hierarchical data using a two-step methodology. For instance, because the present systems and methods allow for a first version of the hierarchical data to be stored in a database alongside the second version of the hierarchical data and then pushed to being the version used in the provider computing system, in response to receiving a request, the present systems and methods provide for a more thorough and accurate rollout of the latest version of the hierarchical data. For instance, by storing both versions of hierarchical data in the database, the present systems and methods allow the latest version of the hierarchical data to be downloaded, checked across each of the datasheets, and then applied to each datasheet. By doing so, the present systems and methods provide for less error and correcting of cases and datasheets when versioning the hierarchical data (by allowing the admin or user to determine the affected cases), thereby providing for more accurate reporting of case datasets and generation of datasheets and less processing power and memory to correct cases or datasheets for which the medical code(s) was incorrectly applied.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) via a medical term and associated with a specific MedDRA code. Moreover, "event information," "medical event information," "adverse event information," "event data," "medical event data," or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information," "case data," or "case dataset" can include information associated with or included in the case such as adverse event data, case contact data, case priority data, case seriousness data, case documents, medical product registrations, patient data, and other data associated with a case as defined by the standard ISO/HL7 27953 as well as any past or future standards governing ICSRs of the ISO, the WHO, the Food and Drug Administration (FDA), the European Medicines Agency (EMA), or other national health agencies governing ICSRs.

As used herein, "hierarchical data" or "hierarchically-structured data" can include data that has a hierarchical structure including two or more levels to the hierarchy. For instance, the "hierarchical data" can include MedDRA terms and associated codes that are structured following the MedDRA hierarchy. The MedDRA hierarchy includes a five-tier hierarchy of terms and associated codes starting with the highest level, the system organ class, which is followed by the high-level group term, which is followed by the high-level term, which is followed by the preferred term, which is followed by the lowest level term. In this regard, each of the MedDRA terms may be a part of one of the MedDRA levels and may have a parent or higher-level term as well as a child or lower-level term. In another example, the "hierarchical data" can include Systematized Nomenclature of Medicine-Clinical Terms (SNOMED-CT) terms and associated codes which follow the SNOMED-CT hierarchy.

Referring now to FIG. 1, a system 100 for querying hierarchically-structured data from a database is shown, according to an example embodiment. The system 100 includes a provider computing system 104, one or more user computing devices 108, and a trusted hierarchical data repository or database 112 connected by a secure network (e.g., a network 118). In some embodiments, the system 100 further includes a third-party computing system (not shown). The third-party computing system may include the trusted hierarchical data database 112 and be associated with a digital dictionary provider (e.g., the ICH which manages MedDRA, the WHO which manages the WHODrug Dictionary, etc.). In other embodiments, the system 100 may further include an administrator computing device (not shown) associated with an administrator or administrative user.

The network 118 communicably and operably couples the provider computing system 104, the user computing device 108, and the trusted hierarchical data database 112 such that communicable and operable computing may be provided between the provider computing system 104, the user computing device 108, and the trusted hierarchical data database 112 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In some embodiments, the provider computing system 104 may act as a host and provide an application (e.g., a web-based application, a mobile application, etc.) to the user computing device 108 over the network 118 in response to authenticating the respective computing device. In some examples, the provider computing system 104 may be a multi-tenant system where various elements of hardware and software may be shared by one or more customers. In a multi-tenant system, a user is typically associated with a particular customer. In one example, a user (e.g., of the user computing device 108) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, a hierarchical data database or repository 132, and a query database or repository 134. In some embodiments, the provider computing system 104 may include an input/output circuit (e.g., similar to (e.g., the same as) an input/output circuit 162 as will described further herein). In some embodiments, the provider computing system 104 may include a case database or repository (not shown) for storing case datasets and associated case data.

The network interface 126 is structured to establish connections with the user computing device 108 and/or the trusted hierarchical data database 112 by way of the network 118. The network interface 126 includes program logic and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In another example, the network interface 126 may include AS2 gateway logic (not shown) that includes programmable instructions that facilitate communication (transmission and receipt) using the AS2 Gateway communication protocol (as specified in Request for Comment (RFC) 4130) over the network 118 via the network interface 126. For example, using the AS2 gateway logic, the network interface 126 may transmit or receive files (e.g., the source file, a case, etc.) or other data to the third-party computing system (not shown) and/or the user computing device 108 using the AS2 Gateway protocol.

In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The processing circuit 128, as shown, comprises a memory 136, a processor 140, a hierarchical data management circuit 144, and a datasheet management circuit 148. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 140 to control the processing circuit 128. The memory 136 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the hierarchical data management circuit 144 is structured or configured to receive, store, and manage the hierarchical data. For instance, the hierarchical data management circuit 144 may be configured or structured to periodically receive or retrieve an updated set of hierarchical data (e.g., a MedDRA dictionary including one or more updated medicals terms and codes), a set of standard queries, and/or an electronic change file from a trusted source (e.g., a third-party computing system or the trusted hierarchical data database 112, etc.). The electronic change file may identify or include one or more changes to the updated hierarchical data, with the changes identifying the data as well as the type of change (e.g., Hierarchical, Currency, etc.). In some embodiments, the hierarchical data management circuit 144 may retrieve or receive the latest version of the hierarchical data and/or the electronic change file, in response to receiving a request to do so (e.g., from the user computing device 108). In other embodiments, the hierarchical data management circuit 144 may retrieve the latest version of the hierarchical data and/or the electronic change file, in response to a certain timeframe or date/time being met (e.g., twice a year, four times a year, the first day of each month, every year on May $1^{st}$, etc.).

In some embodiments, the hierarchical data management circuit 144 may be structured or configured to execute a set of queries on the updated hierarchical data, in response to the hierarchical data being updated. For instance, the hierarchical data management circuit 144 may retrieve the updated hierarchical data, the electronic change file, and/or the standard queries from the trusted hierarchical data database 112. Then, in response, the hierarchical data management circuit 144 may execute a set of queries (e.g., a first query and a second query) on the updated hierarchical data and return a set of matching hierarchical data. For instance, the hierarchical data management circuit 144 may execute two updated standardized MedDRA queries (SMQs) on the updated hierarchical data and return matching hierarchical data (e.g., multiple MedDRA terms and matching MedDRA codes).

In some embodiments, the hierarchical data management circuit 144 may be configured or structured to receive a request for a piece of hierarchical data (e.g., a MedDRA term or code) and query the hierarchical data database 132 for a match. If a matching piece of hierarchical data is found, the hierarchical data database 132 may return the matching piece of hierarchical data.

The datasheet management circuit 148 is structured or configured to generate and manage datasheets and the data of the datasheets including the hierarchical data of the datasheets. For example, a datasheet, such as a company core datasheet or an investigator's brochure (IB) may include pieces of hierarchical data (e.g., MedDRA terms), which are considered expected or unexpected for a medical product. In one example, the MedDRA term "Acquired C1 inhibitor deficiency" and matching code 10081035 may be considered "unexpected" as a side effect when taking a specific medical product (e.g., Drug X). Accordingly, the core datasheet for drug x may include the MedDRA term with an expectedness of unexpected. In this regard, when adverse event data or case data is received, the datasheet management circuit 148 may receive a request for a specific datasheet of a specific medical product, and query or search a datasheet database (not shown) for a match. If a match is found, the datasheet management circuit 148 may return the matching datasheet, which may be used for determining if an adverse event was expected or unexpected to occur in association with use of the medical product.

The hierarchical data database 132 may be a repository (e.g., a database, cloud storage, etc.) that is structured or configured to receive, store, and manage hierarchical data. For example, the hierarchical data database 132 may be a medDRA term and code database that includes each medDRA term and associated medDRA code of the MedDRA dictionary. In other embodiments, the hierarchical data database 132 may receive and store terms and associated codes of other medical dictionaries or classification standards such as the World Health Organization (WHO) Drug Dictionary, the International Classification of Diseases (ICD), the International Classification of Functioning (ICF), the Interactional Classification of Health Interventions (ICHI), and the like. To do so, the hierarchical data database 132 can be structured according to various database types, such as, relational, hierarchical, network, flat, point-in time, and/or object relational.

In some embodiments, the hierarchical data database 132 automatically provides the most current version of the hierarchical data (e.g., the current version of the MedDRA terms and codes) to the hierarchical data management circuit 144 and/or the user (e.g., of the user computing device 108). Further, the hierarchical data database 132 may provide historical versions of the hierarchical data when requested by the hierarchical data management circuit 144 and/or the user. In some embodiments, the hierarchical data database 132 may include hierarchical data objects associated with each piece of the hierarchical data. For instance, the hierarchical data database 132 may include a MedDRA data object associated with each term and/or code of the MedDRA dictionary. The MedDRA data object may include a reference (e.g., a link, a pointer, etc.) to the higher-level and lower-level term of the respective MedDRA term. Further, the version data may indicate the version of the MedDRA dictionary with which the code is associated (e.g., 32.0). In some embodiments, the hierarchical data database 132 includes a plurality of nonvolatile/non-transitory storage media such as solid-state storage media, hard disk storage media, virtual storage media, cloud-based storage drives, storage servers, and/or the like.

It should be understood that the hierarchical data is hierarchically structured such that there are multiple levels of classification with which each piece of hierarchical data may be associated. For instance, each piece of hierarchical data may be a MedDRA term and code. The MedDRA dictionary is a hierarchical medical dictionary that includes a five-tier hierarchy of terms and associated codes starting with the highest level, the system organ class, which is followed by the high-level group term, which is followed by the high-level term, which is followed by the preferred term (PT), and which is followed by the lowest level term (LLT). In this regard, the hierarchical data database 132 may store each piece of hierarchical data as the MedDRA terms and codes in a hierarchal relationship such that one MedDRA term and code is related to multiple other MedDRA terms and codes of a lower or higher level or hierarchy. For instance, a first piece of hierarchical data may be the MedDRA term "feeling queasy" and the matching MedDRA code. The first piece may be in the LLT level. Further, the first piece of hierarchical data may include a reference pointer or pointer to a higher-level piece of hierarchical data with a higher hierarchical level or classification, the PT level. The higher-level piece may be the MedDRA term "Nausea, which may have a higher-level piece of hierarchical data with the MedDRA term "Nausea and Vomiting Symptoms," which is in the High-Level Term level. This may go on until reaching the highest level, the System Organ Class. Each MedDRA term may have multiple lower-level terms, and, in some cases, multiple higher-level terms. The hierarchical data returned by the hierarchical data database 132 may be of any of the hierarchal levels or classifications.

Additionally, approximately twice a year, the MedDRA dictionary may be updated to include updated terms and codes, to change the hierarchy of terms and codes, and to remove terms and codes. Changes that affect the hierarchy of specific terms and codes (i.e., a new SOC for the LLT, a new PT for the LLT, etc.) are referred to "hierarchical changes" and typically do not need a new term and code to be used in place of a previous term and code (but need an update to the hierarchy surrounding the previous term and code). In comparison, changes in which terms and codes are removed (or become non-current) are referred to as "currency changes" and typically need a new term and code to be used in place of the previous term and code. For instance, an outmoded version of a medical dictionary may include one or more first outmoded medical codes that are outmoded based on a hierarchical change and one or more second outmoded medical codes that are outmoded based on a currency change. For instance, a first outmoded medical code may be outmoded based on a hierarchical change such as a higher-level code (e.g., a parent code) having changed (e.g., from a first higher-level code (e.g., 101111) to a second higher-level code (e.g., 101112)). In another example, a second outmoded medical code may be outmoded based on a currency change such as the second outmoded medical code (e.g., 101113) no longer being current (i.e., noncurrent) or used in the latest version of the digital dictionary (e.g., the new version of the digital dictionary does not have the second outmoded medical code (101113) used.

In some embodiments, when the provider computing system 104 searches the hierarchical data database 132, the lowest matching hierarchy level terms are returned first, followed by higher level hierarchy terms (i.e., if the hierarchical data database 132 returns a first matching search result of a first hierarchy and a second matching search result of a second hierarchy lower than the first hierarchy, the provider computing system 104 will use or return the second matching search result to the user computing device 108 first).

Likewise, the query database 134 may be a repository that is structured or configured to receive, store, and hierarchical data queries and their respective data (e.g., hierarchical data, query types, etc.). For example, the query database 134 may receive individual queries or sets of queries and store the queries therein. Then, in response to receiving a request for one or more of the queries or sets of queries, the query database 134 may provide and/or return the queries stored therein that match the request. For example, the query database 134 may receive a request for a specific set or group of queries titled "custom query set 2". In response, the query database 134 may determine the set of queries with the title custom query set 2 and return each query of the customer query set 2. Further, the query database 134 can be structured according to various database types, such as, relational, hierarchical, network, flat, point-in time, and/or object relational. In some embodiments, the query database 134 includes a plurality of nonvolatile/non-transitory storage media such as solid-state storage media, hard disk storage media, virtual storage media, cloud-based storage drives, storage servers, and/or the like. In some embodiments, the query database 134 may receive a query set data object (also referred to as a query group data object) associated with the specific query set or group and store the query set data object therein.

In some embodiments, the provider computing system 104 may include additional databases not shown in FIG. 1. For instance, the provider computing system 104 may include a datasheet database (not shown) for receiving, storing, and managing datasheets and related data objects. In another example, the provider computing system 104 may include a case database (not shown) for receiving, storing, and managing case datasets and related data objects.

Still referring to FIG. 1, the user computing device 108 can be any type of computing device or computing system. For instance, the user computing device 108 can be one or more of a mobile phone, a tablet computer, a laptop computer, a smart watch, a server computer system, or any other internet-connected device. In operation, the user computing device 108 may communicate and interface with the provider computing system 104 via the network 118 to provide a set of queries for hierarchical data, which may be executed by the provider computing system 104. In some embodiments, the user computing device 108 may be an administrator computing device operated by an administrator. For example, the user computing device 108 may provide authentication information to the provider computing system 104 (e.g., a username and password, a one time use key, etc.) that identifies and authenticates the user computing device 108 as associated with an administrator. Further, in some embodiments, the user computing device 108 may interface with the provider computing system 104 to receive and generate a user interface to update one or more outmoded medical codes, as will be described further herein. As shown, the user computing device 108 may include a network interface 156, a processing circuit 160, and the input/output (I/O) circuit 162.

The network interface 156 is structured to establish connections with the provider computing system 104 by way of the network 118. The network interface 156 includes program logic and/or hardware-based components that connect the user computing device 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The processing circuit 160, as shown, comprises a memory 168, a processor 170, and a user interface generation or rendering circuit 174. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The user interface generation or rendering circuit 174 may be configured to receive a user interface (e.g., a web interface in an HTML file and related files, a downloaded graphical user interface, etc.) from the provider computing system 104 and render the user interface on the user computing device 108 via the I/O circuit 162. In this way, the provider computing system 104 may generate one or more user interfaces and provide the one or more user interfaces to the user interface generation circuit 174 to be rendered on the user computing device 108 (e.g., on a display of the I/O circuit 162 of the user computing device 108).

The I/O circuit 162 is structured to receive communications from and provide communications to the user of the user computing device 108 (e.g., the user). In this regard, the I/O circuit 162 is structured to exchange data with the processing circuit 160 to provide output to the user and to receive input from the user. As a result, the I/O circuit 162 may include a display that may be manipulated by the application. In some embodiments, the I/O circuit 162 may also include a keyboard, a mouse, a joystick, a touch screen, touch areas, soft keys, a microphone, a speaker, a vibration mechanism, a sensor, a RFID scanner, or other input/output devices described herein.

The trusted hierarchical data database 112 may be a trusted repository that is structured or configured to receive, store, and manage hierarchical data (e.g., medDRA terms and associated medDRA codes). For example, the trusted hierarchical data database 112 may be a medDRA term and code database that includes each medDRA term and associated medDRA code of the MedDRA dictionary. In other embodiments, the trusted hierarchical data database 112 may receive and store terms and associated codes of other medical dictionaries or classification standards such as the World Health Organization (WHO) Drug Dictionary, the International Classification of Diseases (ICD), the International Classification of Functioning (ICF), the Interactional Classification of Health Interventions (ICHI), and the like. In this regard, the trusted hierarchical data database 112 may be operated by or associated with a digital dictionary provider (e.g., the International Council for Harmonization of Technical Requirements for Pharmaceuticals for Human Use (ICH), the WHO, etc.). Further, the trusted hierarchical data database 112 may be configured to store the most up-to-date version of the hierarchical data including the updated hierarchical data, the updated hierarchical data queries (e.g., SMQs), and the electronic change log indicating the changes that took place between the most up-to-date version and the previous version of the hierarchical data. In some embodiments, the trusted hierarchical data database 112 may provide the current or most up-to-date version of the hierarchical data and queries to the provider computing system 104, in response to receiving a request to do so. In some embodiments, before outputting the updated hierarchical data, the trusted hierarchical data database 112 may require or request authorization information or data (e.g., a license key, an identifier (e.g., an ID or username), and/or a password). In this regard, the trusted hierarchical data database 112 may receive the authorization data from the provider computing system 104. Then, in response, the trusted hierarchical data database 112 may provide the updated hierarchical data to the provider computing system 104. Further, the trusted hierarchical data database 112 can be structured according to various database types, such as, relational, hierarchical, network, flat, point-in time, and/or object relational. In some embodiments, the trusted hierarchical data database 112 may be a part of a third-party or trusted computer system (not shown).

Figure 2:
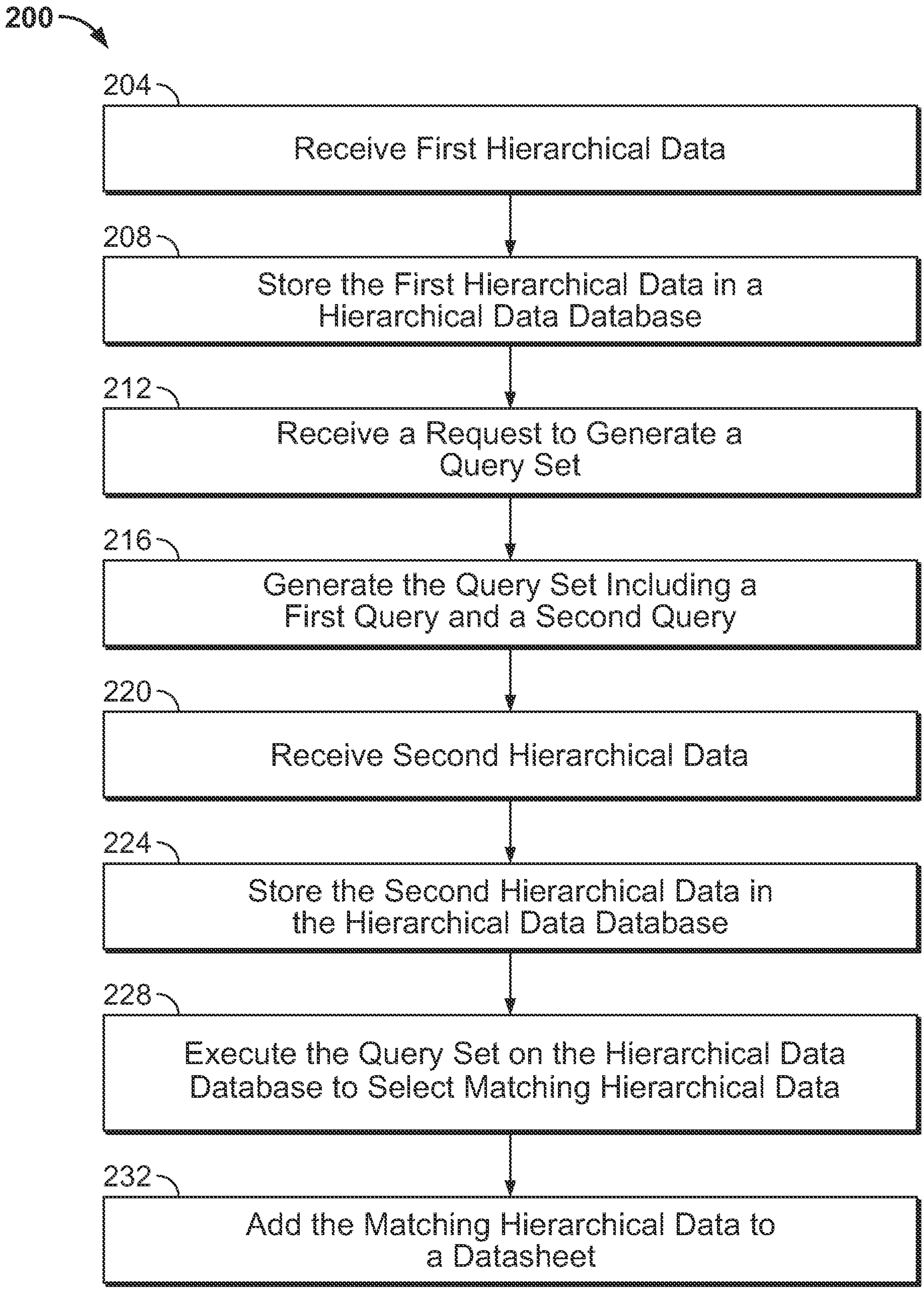
FIG. 2 may be a flow diagram of a method for executing a query on hierarchical data, according to an example embodiment.

Referring now to FIG. 2, a method 200 of executing a query on hierarchical data is shown, according to an example embodiment. Method 200 can be carried out by the system of FIG. 1. More particularly, the method 200 can be carried out by the processing circuit 128 of the provider computing system 104 and through communication with the one or more user computing devices 108.

Method 200 commences at step 204 at which the provider computing system 104 receives first hierarchical data. In some embodiments, the first hierarchical data is received from the user computing device 108. In other embodiments, the first hierarchical data is received from the trusted hierarchical data database 112. Ins some embodiments, the first hierarchical data may be received from the trusted hierarchical data database 112 as part of a larger data package. For example, the first hierarchical data may be received and associated with a first version of a medical dictionary (e.g., the MedDRA dictionary version 25.9). The first version of the MedDRA dictionary may include multiple MedDRA terms and codes (the first hierarchical data) as well as one or more first SMQs associated with the MedDRA dictionary and an electronic change file. As described herein, SMQs or Standardized MedDRA Queries are tools developed to facilitate retrieval of MedDRA-coded data as a first step in investigating drug safety issues in pharmacovigilance and clinical development. SMQs are validated, pre-determined sets of MedDRA terms grouped together after extensive review, testing, analysis, and expert discussion. The SMQs are maintained with each release of MedDRA by the organization that manages MedDRA (e.g., the Maintenance and Support Services Organization (MSSO)). An example of SMQs include the SMQ Anaphylactic reaction, the SMQ Central nervous system vascular disorders, the SMQ Convulsions, the SMQ COVID-19, and so on. In this regard, with each release of the MedDRA dictionary, new SMQs may be created and pre-existing SMQs may be updated or altered to include new MedDRA terms or to remove old MedDRA terms.

In comparison, a custom medDRA query (also referred to as a CMQ) may be an individually-customizable query that is maintained by the provider computing system 104. For instance, a CMQ may be used by the provider computing system 104 to group together pieces of hierarchical data (e.g., MedDRA terms). In one example, a CMQ titled "vaccine reactions" may include multiple pieces of hierarchal data that are related to adverse reactions that are expected to occur when a vaccine is received such as the MedDRA terms "chills," "fever under 100 degrees," and "injection site soreness". In some embodiments, the hierarchical data of the CMQ may be received from the user computing device 108 in a CMQ generation request. For instance, the user computing device 108 may provide a CMQ generation request identifying a name of the CMQ, the pieces of hierarchical data to be included in the CMQ, and/or the MedDRA version to which the CMQ applies. In this regard, a "custom query" may be managed and updated by the provider computing system 104 (e.g., in response to receiving a request from the user computing device 108), whereas a "standardized query" may be managed by a regulatory or standards organization such as the organization that manages MedDRA. In this regard, a "standardized query" may be updated and managed by the trusted hierarchical data database 112 or the third-party computing system (not shown) that includes the trusted hierarchical data database 112.

Once the provider computing system 104 has received the first hierarchical data, the method proceeds to step 208 at which the provider computing system 104 stores the first hierarchical data in the hierarchical data database 108. In some embodiments, before or at step 208, the provider computing system 104 may generate a hierarchical version data object (a medDRA version data object) and/or a hierarchical data object (also referred to as a MedDRA data object (meddra_v)) and add the hierarchical data to the hierarchical data object. The hierarchical data object may be generated following a hierarchical data schema. An example of the hierarchical data schema is shown below:

```
(meddra_version_v): {
  central_release_name_v: String;
  meddra_v: Object(MedDRA): {
    llt_code_v: String;
    llt_term_v: String;
    pt_code_v: String;
    pt_term_v: String;
    hlt_code_v: String;
    hlt_term_v: String;
    hlgt_code_v: String;
    hlgt_term_v: String;
    soc_code_v: String;
    soc_term_v: String;
    language_v: Picklist;
    primary_soc_v: Bool;    }}
```

As shown, following the hierarchical data schema, the hierarchical data object may include one or more fields for storing hierarchical data therein. For instance, the hierarchical data object includes a lowest level term (LLT) code field, an LLT term field, a preferred term (PT) code field, a PT term field, a high level (HL) code field, a HL term field, a high level group term (HLGT) code field, a HLGT term field, a system organ class (SOC) code field, and a SOC term field. Further, as shown, each hierarchical data object may be a child data object of (i.e., depends on) a MedDRA version data object. For instance, a specific version of the MedDRA dictionary (e.g., version 26.0) may be represented by an individual MedDRA version data object, and have a child MedDRA data object for each term of the MedDRA dictionary. For example, in response to receiving updated hierarchical data representing version 26.0 of the MedDRA dictionary, the provider computing system 104 may generate a MedDRA version data object and populate the central release name data object with the value 26.0. Then, for each piece of updated hierarchical data, the provider computing system 104 may generate a MedDRA data object and populate the MedDRA data object with the corresponding fields. For example, MedDRA version 26.0 includes the PT "nausea." Accordingly, in response to receiving MedDRA version 26.0 at step 804, the provider computing system 104 may generate a MedDRA data object and populate the PT term field with the term "Nausea". Further, the provider computing system 104 may populate the HLT term field with the term "Nausea and vomiting symptoms" (because Nausea and vomiting symptoms is the higher-level term of Nausea); the HLGT term field with the term "Gastrointestinal signs and symptoms" (because Gastrointestinal signs and symptoms is the higher-level term of Nausea and vomiting symptoms); and the SOC term field with the term "Gastrointestinal Disorders" (because Gastrointestinal Disorders is the higher-level term of Gastrointestinal signs and symptoms). The LLT term and code fields may be left blank to indicate that the MedDRA data object is associated with a PT. This process may be repeated for each and every term of the MedDRA dictionary version.

In some embodiments, at step 208, the provider computing system 104 may generate and populate the hierarchical data objects with the first hierarchical data. For instance, for each piece of the first hierarchical data (e.g., for each MedDRA term), the provider computing system 104 may generate a hierarchical data object and populate the hierarchical data object with the respective piece of the first hierarchical data. The provider computing system 104 may then store the hierarchical data objects in the hierarchical data database 132.

Once the provider computing system 104 has stored the first hierarchical data, the method 200 proceeds to step 212 at which the provider computing system 104 receives a request to generate a query set. In some embodiments, the request to generate the query set may be received from the user computing device 108. Further, the request may identify at least a first query and a second query to be included in the query set. For instance, the query set may identify a first SMQ and a second SMQ. In some embodiments, the request to generate the query set may identify a first query of a first type (e.g., an SMQ) and a second query of a second type (e.g., a CMQ). In some embodiments, the request may identify or include multiple additional queries (e.g., a first, second, and third query, and so on) to be included in the query set.

In some embodiments, at or before step 212, the provider computing system 104 may provide a listing of each of the queries stored in the query database 134 that a query set may potentially include. For instance, the provider computing system 104 may provide a list of each of the SMQs received from the trusted hierarchical data database as well as each of the previously received CMQs that are stored in the query database 134. In one example, at or before step 204, the provider computing system 104 may receive 100 SMQs from the trusted hierarchical data database 112 including multiple pieces of hierarchical data associated or included in each SMQ. Then, the provider computing system 104 may store each of the SMQs in the query database 134. Further, at or before step 212, the provider computing system 104 may provide a listing of all 100 SMQs to the user computing device 108 for display on a user interface thereon. The user of the user computing device 108 may then select one or more of the SMQs to be included in the query set. In response, the user computing device 108 may generate a request to generate a query set and identify the selected SMQs in the request.

Once the provider computing system 104 has received the request to generate the query set, the method 200 proceeds to step 216 at which the provider computing system 104 generates the query set including the queries identified in the request. For instance, the request to generate the query set may identify the first query (e.g., an SMQ) and the second query (e.g., a CMQ). In response, the provider computing system 104 may generate the query set including the first and second query. In some embodiments, to generate the query set, the provider computing system 104 may generate a query set data object and add the queries to the query set data object. The query set data object (also referred to as the medDRA query data object) may be generated following a hierarchical query schema. An example of the hierarchical query schema is shown below:

```
(meddra_query): {
  name_v: String;
  level_v: Int;
  description_v: LongText;
  meddra_version_v: Object(MedDRA Version);
  meddra_building_block_v: Object(MedDRA Building Block) {
    structured_meddra_query_v: Object(Structured MedDRA Query) {
      name_v: String;
      meddra_v: Object(MedDRA); }
    custom_meddra_query_v: Object(Custom MedDRA Query {
      name_v: String;
      meddra_v: Object(MedDRA); }
  datasheet_meddra_query_v: Object(Datasheet MedDRA Query) {
    name_v: String;
    expectedness_v: Picklist;
    seriousness_exclusion_v: Picklist;
    datasheet_v: Object(datasheet);
    description_v: LongText;
    active_start_date_v: Date;
    active_end_date_v: Date; } }
```

As shown, following the hierarchical query schema, the query set data object may include one or more fields and child (also referred to as dependent) data objects for storing the queries and the data of the queries therein. For instance, the query set data object includes a name field, a level field, a description field, a pointer to the respective MedDRA version data object for which the query set is applicable, one or more MedDRA building block child data objects (also referred to as query data objects), and a child datasheet query data object. As described herein, the query set may represent or include multiple queries therein. Accordingly, each MedDRA building block or query data object may include a specific query data object (e.g., a standardized or SMQ data object or a custom query or CMQ data object) therein, with one or more pieces of hierarchical data (e.g., MedDRA terms) included in each SMQ or CMQ. For instance, a query set may include a first query that is an SMQ and a second query that is a CMQ. Accordingly, the provider computing system 104 may generate the query set data object to include a first child query data object for the SMQ and a second child query data object for the CMQ. The first child query data object may include the MedDRA terms included in the SMQ, and the second child query data object may include the MedDRA terms included in the CMQ.

In some embodiments, at or after step 216, the provider computing system 104 may store the query set and/or the query set data object in the query database 134. For instance, the provider computing system 104 may generate the query set data object including the first query data object and the second query data object and store the query set data object in the query database 134.

Once the provider computing system 104 has generated the query set, the method 200 proceeds to step 220 at which the provider computing system 104 receives second hierarchical data. The second hierarchical data may be received from the trusted hierarchical data database 112 and received along with an electronic change file and/or a second set of SMQs. In this regard, the second hierarchical data may be associated with a second version of a medical dictionary (e.g., version 26.0), and be similar to the first hierarchical data but include a couple of changes (e.g., hierarchical changes, currency changes, etc.) as compared to the first hierarchical data. The changes may be identified in the electronic change file. In one example, the first hierarchical data associated with the first version of the medical dictionary (e.g., version 25.9) may include 10,000 terms and associated codes of various hierarchical levels. Likewise, the second hierarchical data associated with the second version of the medical dictionary (e.g., version 26.0) may include 10,000 terms and associated codes of various hierarchical levels. However, one term and associated code of the second hierarchical data may have undergone a hierarchical change, and have a different hierarchical structure (e.g., a different HLT, a different HLGT, and a different SOC) then the same term of the first hierarchical data.

The second group or set of standardized queries (e.g., SMQs) may be received along with the second hierarchical data, and be similar to the first set of standardized queries but include a couple of changes (e.g., additional terms in one query, less terms in a second query, the addition of a $101^{st}$ query, etc . . . ) as compared to the first set of standardized queries. In one example, the first SMQs associated with the first version of the medical dictionary (e.g., version 25.9) may include 100 SMQs and the terms and associated codes included in each SMQ. In comparison, the SMQs associated with the second version of the medical dictionary (e.g., version 26.0) may include 101 SMQs and the terms and associated codes included in each SMQ due to the creation of a new SMQ. Further, one of the SMQs (e.g., hypersensitivity) of the second SMQs may include an additional two terms and associated codes, then the same SMQ of the first set of SMQs.

In some embodiments, the second group of set of standardized queries may include all new queries. For instance, the first group of standardized queries may include a first query, a second query, and a third query. Then, the second group of standardized queries may include a fourth query, a fifth query, a sixth query, and a seventh query. The fourth query may be a new version of the first query (e.g., have the same name and much of the same hierarchical data but be associated with the new version of the hierarchical data and possibly have some updates). The fifth query may be a new version of the second query. The sixth query may be a new version of the third query. In comparison, the seventh query may be an entirely new standardized query that was added in the latest version of the hierarchical data such that it has no counterpart in the first group of queries.

In some embodiments, in response to receiving new queries as a part of the second data package, the provider computing system 104 may update or replace the counterpart standardized queries of the query set. For instance, using the example above, the query set may include the first query and the second query. Then, in response to the receiving the fourth query and the fifth query, provider computing system 104 may replace the first query with the new version of the first query (the fourth query) and the second query with the new version of the second query (the fifth query). For instance, in the MedDRA building block data object, the provider computing system 104 may update or replace the standardized query data object with the new version of the standardized query data object. In some embodiments, the provider computing system 104 may generate a new standardized query data object based on the received standardized query (e.g., the fourth query) and then replace the old standardized query data object (e.g., the data object for the first query) with the newly generated standardized query data object of the new version of the query.

Once the provider computing system 104 has received the second hierarchical data, the method 200 proceeds to step 224 at which the provider computing system 104 stores the second hierarchical data in the hierarchical data database 132. In some embodiments, the provider computing system 104 may generate a second hierarchical version data object as well as one or more hierarchical data objects (e.g., one hierarchical data object for each piece of second hierarchical data) and populate the hierarchical data objects with the second hierarchical data. For instance, in response to receiving second hierarchical data associated with a second version of the medical dictionary, the provider computing system 104 may generate a second hierarchical version data object and populate the second hierarchical version data object. In one example, the provider computing system 104 may populate the central release name with the version of the release (e.g., "26.0") and generate a hierarchical data object for each term and associated code of the second hierarchical data (e.g., 10,000 hierarchical data objects for each of the 10,000 terms and associated codes). Then, at step 224, the provider computing system 104 may store the second hierarchical version data object and the hierarchical data objects in the hierarchical data database 132, along with the first hierarchical version data object and associated hierarchical data objects. In this regard, previous versions of the medical dictionary may be represented by the previous hierarchical version data objects and associated hierarchical data objects.

In some embodiments, at or after step 224, the provider computing system 104 may store the received second standardized queries in the query database 134. For instance, the provider computing system 104 may receive a second set of standardized queries, from the trusted hierarchical data database 112, and store the second set of standardized queries in the query database 134. In some embodiments, the provider computing system 104 may store the second set of standardized queries in place of the first set of standardized queries. For instance, the first standardized queries may be stored in the query database 134 at or after step 204. Then, in response to receiving the second set of standardized queries, the provider computing system 104 may replace each of the first standardized queries with the second standardized queries. In one example, the first SMQs associated with the first version of the medical dictionary (e.g., version 25.9) may include 100 SMQs and the terms and associated codes included in each SMQ. In comparison, the SMQs associated with the second version of the medical dictionary (e.g., version 26.0) may include 101 SMQs and the terms and associated codes included in each SMQ due to the creation of a new SMQ. Further, one of the SMQs (e.g., hypersensitivity) of the second SMQs may include an additional two terms and associated codes. Accordingly, the second SMQ "hypersensitivity" may replace the first SMQ "hypersensitivity" such that the two terms and associated codes are included in the SMQ "hypersensitivity."

In some embodiments, to store the standardized queries in the query database 134, the provider computing system 104 may generate a standardized query data object for each of the standardized queries and populate the standardized query data object based on the received standardized queries. For instance, for the SMQ "hypersensitivity," the provider computing system 104 may generate an SMQ data object and populate the name field with the term "hypersensitivity." Further, the provider computing system 104 may populate the SMQ data object with a pointer to the MedDRA data object for each of the MedDRA terms of the SMQ. For example, the SMQ hypersensitivity may include four PTs including Injection site hypersensitivity, Eczema aggravated, Lichenoid drug reaction, and Edema gum. Accordingly, the provider computing system 104 may populate the SMQ data object with: a first reference pointer or link to a first MedDRA data object for the term Injection site hypersensitivity, a second reference pointer or link to a second MedDRA data object for the term Eczema aggravated, a third reference pointer or link to a third MedDRA data object for the term Lichenoid drug reaction, and a fourth reference pointer or link to a fourth MedDRA data object for the term Edema gum.

Once the provider computing system 104 has stored the second hierarchical data, the method 200 proceeds to step 228 at which the provider computing system 104 executes each query of the query set on the hierarchical data database 132 to determine or select matching hierarchical data from the hierarchical data database 132. For instance, the query set may include a first query identifying ten pieces of hierarchical data (e.g., ten MedDRA terms) and a second query identifying fifteen pieces of hierarchical data (e.g., fifteen MedDRA terms). Accordingly, at step 228, the provider computing system 104 may search the hierarchical data database 132 for the ten pieces of hierarchical data of the first query and the fifteen pieces of hierarchical data of the second query and return the matching hierarchical data. In some embodiments, one of the queries of the query set may include or identify a relatively high-level piece of hierarchical data (e.g., a HLGT, a HLT, an SOC, etc.). For instance, the first query may include or identify the MedDRA HLGT "Epidermal and dermal conditions," which includes approximately 16 lower-level HLTs. The 16 HLTs then include approximately 300 PTs.

Accordingly, when executing the query on the hierarchical data database 132, the provider computing system 104 may select or retrieve each piece of hierarchical data that is in the hierarchy of the HLGT "Epidermal and dermal conditions," and is a PT or an LLT. For instance, the provider computing system 104 may retrieve each PT or LLT that is related to (e.g., within the hierarchy) of the HLGT "Epidermal and dermal conditions." In this example, that would include each of the approximately 300 PTs of the 16 HLTs of the HLGT "Epidermal and dermal conditions."

In some embodiments, the provider computing system 104 may proceed to step 228 in response to receiving and storing updated (e.g., the second) hierarchical data. In other embodiments, the provider computing system 104 may proceed to step 228 in response to receiving a request to update the hierarchical data of a datasheet or a watchlist. For instance, via a datasheet page 300 (see FIGS. 3A-3B), the user of the user computing device 108 may provide an indication (e.g., by selecting a button) that the hierarchical data of the datasheet is to be updated. In response, the user computing device 108 may provide a request to the provider computing system 104 to update the hierarchical data of the datasheet. In some embodiments, the request may include or identify the version to which the hierarchical data is to be updated to. For instance, the request may identify the hierarchical data that is to be updated to version 26.0. In response, the provider computing system 104 may execute the queries of the query set, which may be identified in the datasheet query set data object, on the hierarchical data stored in the hierarchical version data object of version 26.0 (as identified in the central release name field).

Once the provider computing system 104 has executed the queries of the query set and selected matching hierarchical data, the method 200 proceeds to step 232 at which the provider computing system 104 adds the matching hierarchical data to a datasheet. In some embodiments, prior to step 232, the provider computing system 104 may select a datasheet from the datasheet database (not shown) based on the datasheet query data object of the query set data object. For instance, a query set may be applied or associated with a specific datasheet (e.g., the company core datasheet for medical product X), as indicated by the datasheet query data object. Accordingly, prior to step 232, the provider computing system 104 may select the datasheet from the datasheet repository (not shown) and add each piece of the matching hierarchical data to the datasheet. In some embodiments, the query set may be applied or associated with multiple datasheets (as indicated by multiple child datasheet query set data objects) (e.g., a first datasheet and a second datasheet). Accordingly, prior to step 232, the provider computing system 104 may select the first datasheet and the second datasheet from the datasheet repository (not shown) and add each piece of the matching hierarchical data to each of the datasheets.

Figure 3A:
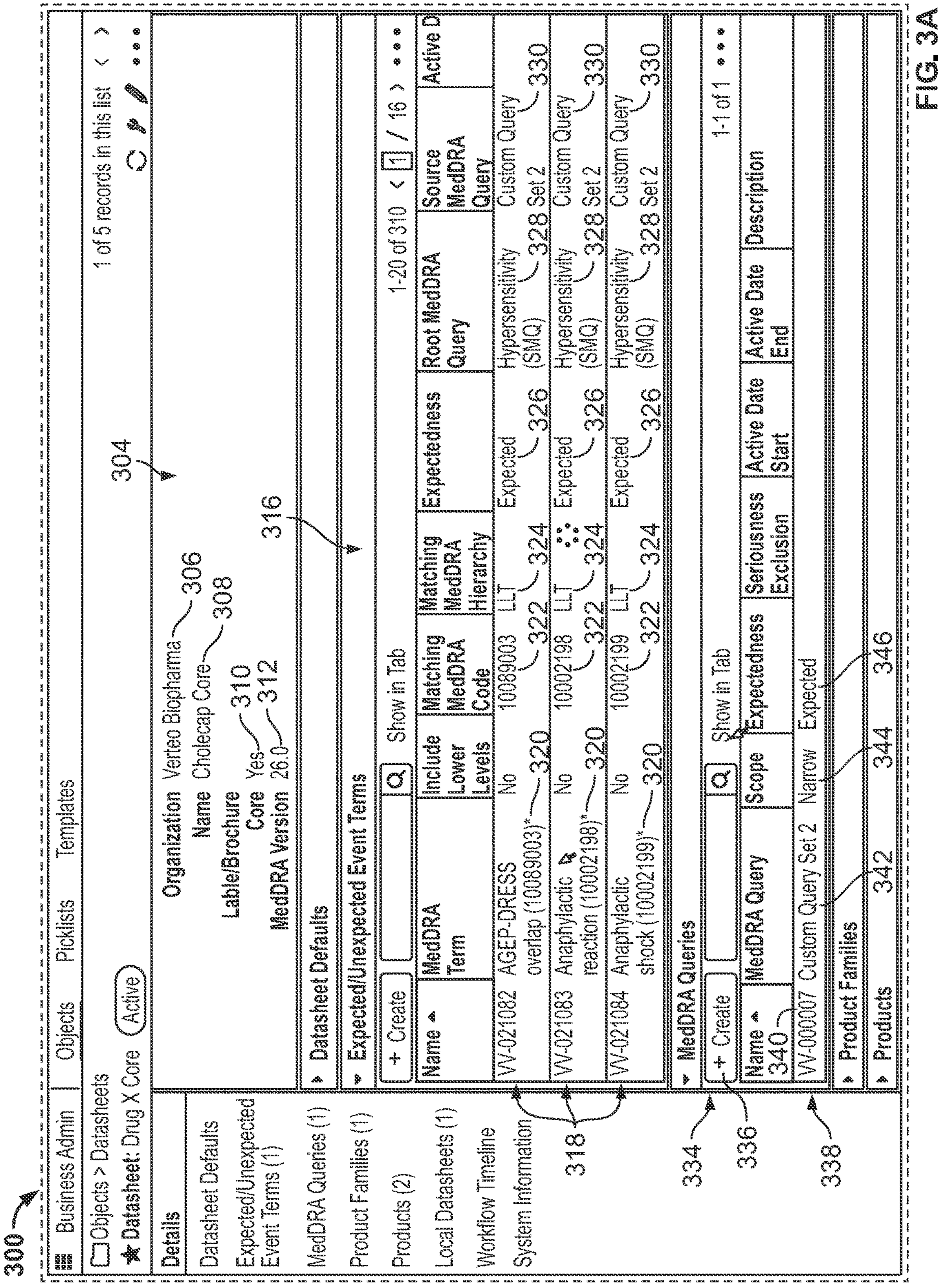
FIGS. 3A-3B may be illustrations of some aspects of a user interface generated by the hierarchical data system of FIG. 1 to manage a specific datasheet, according to an example embodiment.

In some embodiments, the datasheet query set data object may further include an expectedness or expectedness data, a seriousness exclusion, a start date, and/or an end date which are to be added or applied to the matching hierarchical data before it is added to the datasheet. In this regard, before or at step 232, the provider computing system 104 may add or apply the data of the datasheet query set data object to the hierarchical data. For instance, a piece of hierarchical data may include a MedDRA term, a MedDRA code, a version of the MedDRA dictionary, and/or a hierarchical level of the MedDRA term. In comparison, the hierarchical data which may be added to the datasheet may further include all of the data of the hierarchical data, but further include the expectedness, the seriousness exclusion, the start date, and/or the end date (as shown in FIG. 3A). In this regard, before step 232, the provider computing system 104 may add each of the fields of the datasheet query set data object to the hierarchical data to generate combination hierarchical data including the matching hierarchical data. Then at step 232, the provider computing system 104 may add the combination hierarchical data to the datasheet.

In some embodiments, the selected datasheet may have outdated or outmoded (combination) hierarchical data included therein, and the provider computing system 104 may replace the outmoded (combination) hierarchical data with the matching (combination) hierarchical data selected from the hierarchical data database 132. For instance, the datasheet may include multiple pieces of hierarchical data from a previous version of the hierarchical data. In this regard, the provider computing system 104 may remove the outmoded pieces of hierarchical data and replace them with the new matching hierarchical data.

In some embodiments, after step 232, the provider computing system 104 may store the updated datasheet including the matching pieces of hierarchical data in the datasheet database. Then, in response to receiving intaking a case dataset identifying an adverse event and a medical product (or a study), the provider computing system 104 may select the datasheet from the datasheet database, and determine if the adverse event is expected or unexpected based on the matching hierarchical of the datasheet. For instance, when the hierarchical data is added to the datasheet, the provider computing system 104 may add an annotation or field indicating whether each piece of hierarchical data is expected or unexpected (as will be described further herein with regard to FIGS. 3A-3B). Then, when a case dataset is received and intaken, the provider computing system 104 may search the matching hierarchical data for an adverse event term that matches the adverse event term of the case dataset. If a match is found, the adverse event may be marked expected or unexpected based on the annotation or field indicating expectedness.

Referring now to FIGS. 3A-5, user interfaces shown and displayed to the user of the one or more user computing devices 108 during the method 200 are shown, according to example embodiments. As described herein, the user interfaces of FIGS. 3A-5 may be one or more of web interfaces generated by the provider computing system 104 and rendered by each of the user computing devices 108 as part of a web application or graphical user interfaces downloaded and generated by each of the user computing devices 108 as part of a software application (e.g., a mobile application, etc.). Further, the user interfaces shown on FIGS. 3A-5 allow for communication between the user and the provider computing system 104 via the respective user computing device 108 (specifically via the I/O circuit 162). Through interaction with the various user interfaces, the user may provide user input, feedback, and other data requested by the provider computing system 104. In this regard, it should be understood that each interaction described herein by the user with the user interfaces of FIGS. 3-5 may be provided to one or more of the user computing devices 108 and then transmitted to the provider computing system 104 and that each action described herein as occurring to the respective user computing device 108 (e.g., navigating to a certain page, generating a popup, etc.) may be performed by the provider computing system 104.

Figure 3B:
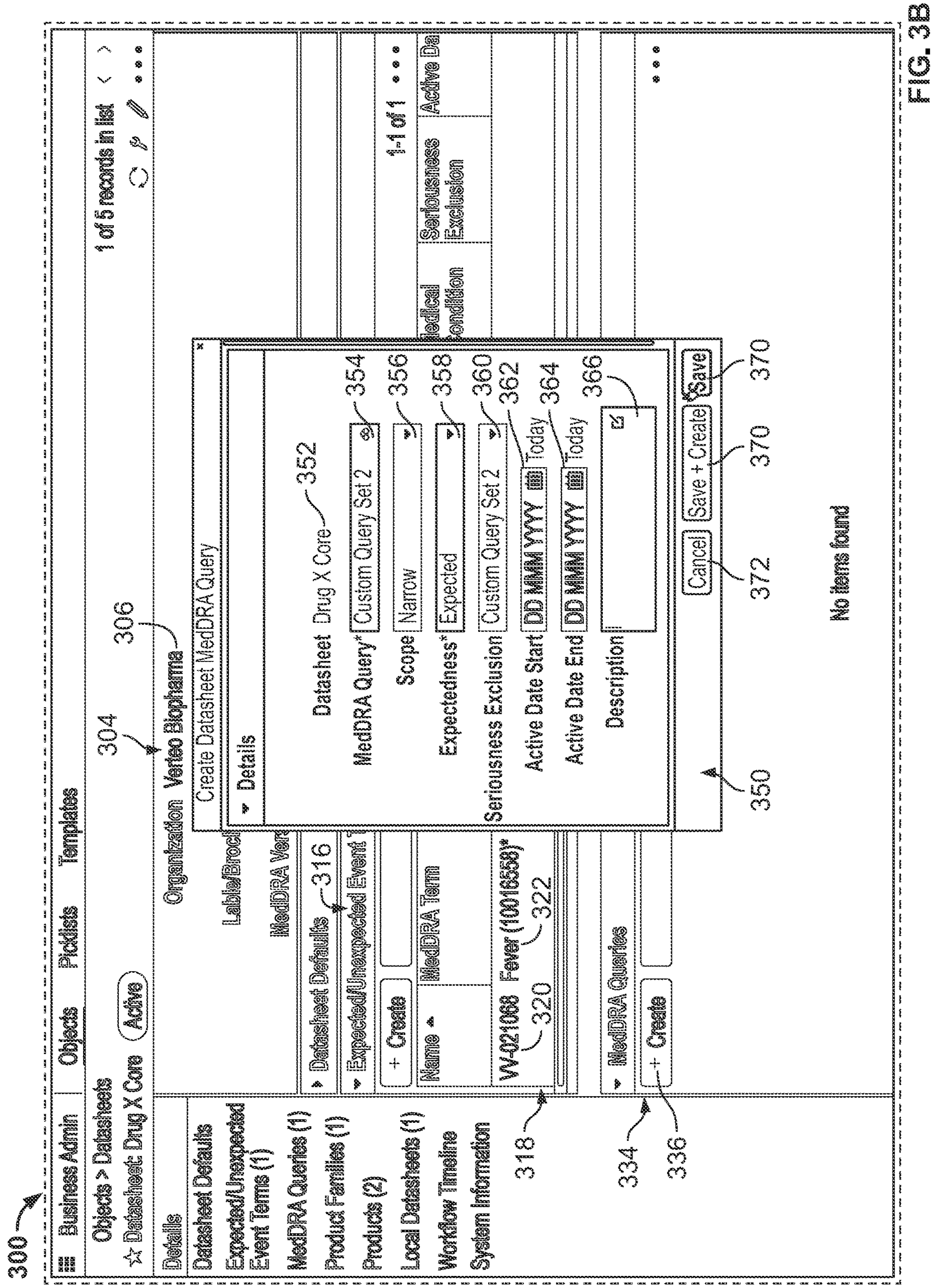

Referring now to FIGS. 3A-3B, the datasheet page 300 which can be displayed on a display of the I/O circuit 162 of the user computing device 108, is shown. In general, the datasheet page 300 provides the user with an interface to set up and manage a specific datasheet (e.g., a company core datasheet) as well as one or more expected or unexpected adverse event terms (e.g., MedDRA terms, as shown). As shown, the datasheet page 300 includes a details section 304, an expected/unexpected terms section 316, a query set section 334, and a create query set popup page 350. To render or generate the datasheet page 300 on the user computing device 108, the provider computing system 104 may provide the datasheet including the matching hierarchical data of the datasheet as well as the datasheet query data object (or the data thereof) to the user computing device 108 for display thereon. In this regard, it should be understood that each of the fields and/or sections of the datasheet page 300 may be data included in a datasheet data object. For instance, the datasheet page 300 is shown to include the query set section 334. In this regard, the datasheet data object may include a reference to a (child) datasheet query set data object.

The details section 304 provides the user of the user computing device 108 with an interface to review general data or details of the datasheet of the datasheet page 300. For instance, as shown, the details section 304 includes an organization field 306, a name field 308, a core field 310, and a hierarchical data version 312.

The organization field 306 may be a modifiable and editable text field through which the user of the user computing device 108 can initially set and/or edit the organization with which the datasheet of the datasheet page 300 is associated, which may then be provided to the provider computing system 104 by the user computing device 108. In some embodiments, the organization field 306 may include or identify a specific customer (e.g., "verteo biopharma") of the provider. Likewise, the name field 308 may be a modifiable and editable text field through which the user of the user computing device 108 can initially set and/or edit the name of the datasheet of the datasheet page 300, which may then be provided to the provider computing system 104 by the user computing device 108.

The core field 310 may be a modifiable and editable text or Yes/No field through which the user of the user computing device 108 can initially set and/or edit whether the datasheet of the datasheet page 300 is a core datasheet, which may then be provided to the provider computing system 104 by the user computing device 108. As described herein, core datasheets may be used, by the provider computing system, for determining expectedness of adverse events in all countries/health agency jurisdictions, whereas non-core or local datasheets may be used, by the provider computing system, for determining expectedness of adverse events in a specific country or health agency jurisdiction (e.g., Japan or the Pmda). Likewise, the hierarchical data version field 312 may be a data field that indicates the version of the hierarchical data used for the datasheet of the datasheet page 300. In this regard, if a new version of the hierarchical data is used to update the datasheet, the hierarchical data version field 312 may be updated, by the provider computing system 104, to reflect the new version (e.g., version 26.1 as compared to version 26.0).

The expected/unexpected data section 316 may provide the user of the user computing device 108 with an interface to remove, add, and/or edit the expected or unexpected hierarchical data of the datasheet. As described herein, datasheets can be used by the provider computing system 104 to determine which pieces of hierarchical data (e.g., adverse events or adverse event terms) are expected or unexpected to occur when a specific medical product is used (e.g., drug x). For instance, U.S. patent application Ser. No. 18/446,915 filed on Aug. 9, 2023 and U.S. patent application Ser. No. 17/691,751 filed on Mar. 10, 2022, both of which are incorporated herein by reference in their entirety, detail a method 200 and a method 300 in which a computer system may determine if each received adverse event, for a specific medical product, is expected or unexpected, based on a datasheet (also referred to as an electronic reference document).

In some embodiments, the provider computing system 104 may include an expectedness analyzation circuit (not shown) similar to the expectedness analyzation circuit 152 of the previously aforementioned patent applications. In this regard, the provider computing system 104 may receive adverse event information as well as a request to generate a case dataset associated with or based on the adverse event of the adverse event data. The provider computing system 104 may then determine a datasheet associated with the adverse event (e.g., based on a medical product or study of the adverse event data) and receive or select the datasheet from a datasheet repository (not shown). The datasheet may include multiple expected or unexpected pieces of hierarchical data (e.g., adverse event terms or reactions). Then, based on the multiple expected or unexpected pieces of hierarchical data of the datasheet, the provider computing system 104 may determine and indicate if the adverse event is expected or unexpected. In some embodiments, if the hierarchical data of the datasheet is of a higher hierarchical level that includes the piece of hierarchical data of the adverse event, the provider computing system 104 may consider as such a match and indicate whether the event is expected or unexpected. For instance, the hierarchical data of the datasheet may include the HLGT term "Body temperature conditions" and indicate the term is expected. Likewise, the adverse event data may include a piece of hierarchical data including the LLT term "temperature regulation disorder." In response, the provider computing system 104 may determine the adverse event is expected because the LLT term is within the hierarchy of the expected HLGT term. Further, the provider computing system 104 may determine a submission timeframe based on the expectedness. In one example, an unexpected adverse event may have a shorter submission timeframe than an expected adverse event. The provider computing system 104 may then output the case dataset based on the submission timeframe. Further discussion of the expectedness analyzation circuit and the uses of the datasheet (or electronic reference document) may be described with reference to the aforementioned patent applications.

As shown, the expected/unexpected terms or hierarchical data section 316 includes multiple hierarchical data representations 318 or combination hierarchical data representations 318. Each (combination) hierarchical data representation 318 may represent a specific piece of hierarchical data (e.g., a MedDRA term or code) and indicate whether the piece of hierarchical data is expected or unexpected when using a specific medical product. In the example shown, the datasheet of the datasheet 300 page includes three expected pieces of hierarchical data including the first MedDRA code 10089003, the second MedDRA code 10002198, and the third medDRA code 10002199.

Each (combination) hierarchical data representation 318 includes a term field 320, a code field 322, a hierarchy level field 324, an expectedness field 326, a root query field 328, and a source query set field 330. The term field 320 may be a text or data field that includes the term of the piece of hierarchical data associated with the respective hierarchical data representation 318. For instance, the first (top) term field 320 is shown to include the term "AGEP-DRESS" overlap. Likewise, the code field 322 may be a text or data field that includes the code of the piece of hierarchical data associated with the hierarchical data representation 318. For instance, the first code field 322 is shown to include the code "10089003". Similarly, the hierarchy level field 324 may be a text or data field that includes tor identifies the hierarchy level of the piece of hierarchical data associated with the hierarchical data representation 318.

The expectedness field 326 may be an editable data field through which the user computing device 108 can initially set and/or edit the expectedness of the piece of (combination) hierarchical data of the (combination) hierarchical data representation 318, which may then be provided to the provider computing system 104 by the user computing device 108. For instance, the expectedness field 326 may be one of the fields (along with the seriousness exclusion, the active start date, and the active end date) which the provider computing system 104 adds to the piece of hierarchical data to generate combination hierarchical data. In the example shown, the provider computing system 104 may execute the query set shown in the query set section 334 and select multiple pieces of matching hierarchical data (e.g., the three pieces shown in the hierarchical data section 316). Then, based on the expectedness of the datasheet query set (e.g., "expected" in this example), the provider computing system 104 may add the expectedness of the datasheet query set to each piece of matching hierarchical data to generate combination hierarchical data. The expectedness may indicate whether the adverse event term or code of the hierarchical data is expected when taking or using a medical product of the datasheet. In some embodiments, each (combination) hierarchical data representation 318 further includes a seriousness exclusion field (not shown), an active start date field (not shown), and an active end date field (not shown).

Figure 4:
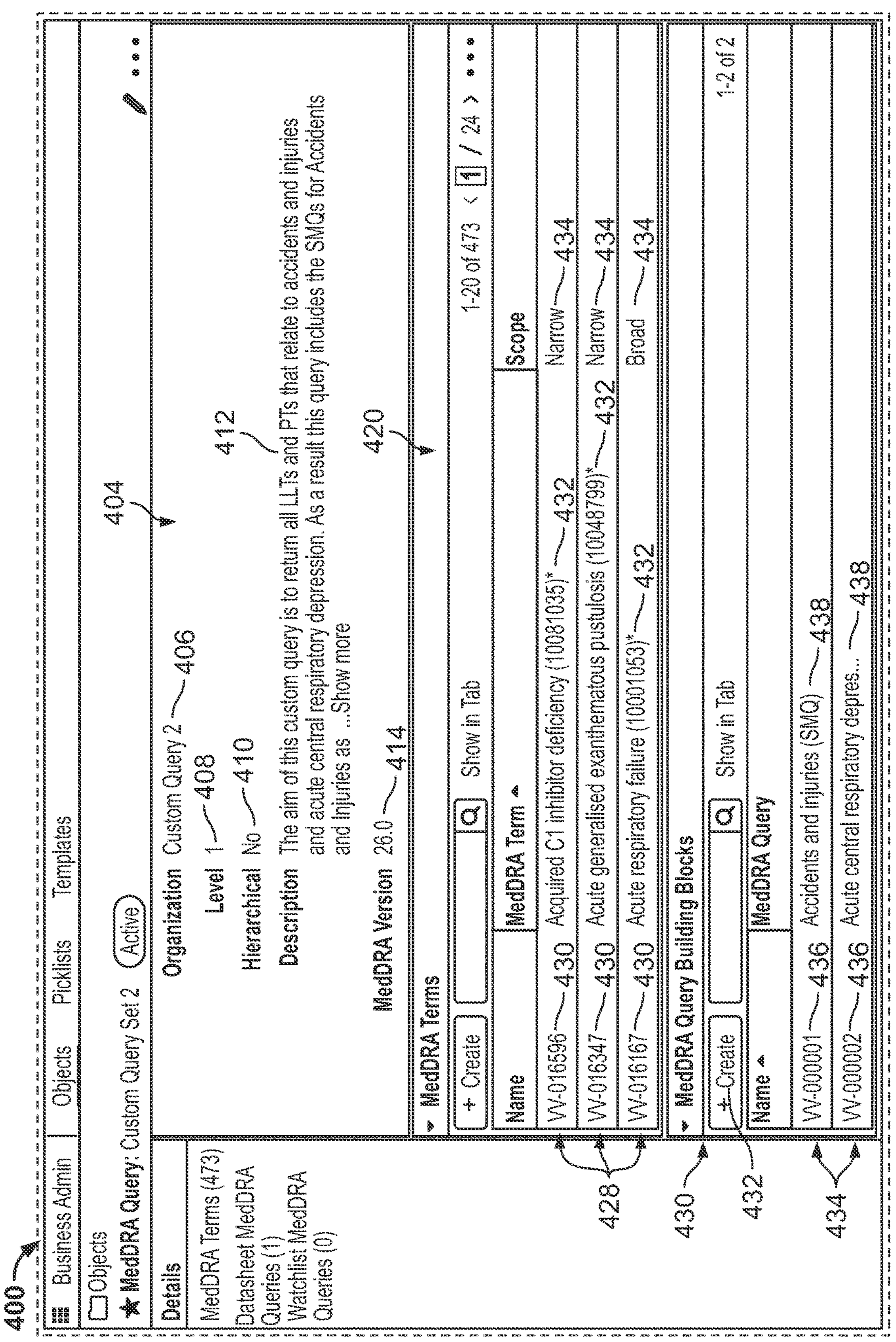
FIG. 4 may be an illustration of some aspects of a user interface generated by the hierarchical data system of FIG. 1 to manage a query set, according to an example embodiment.

The root query field 328 may be a data field which is updated by the provider computing system 104 to indicate the root query (e.g., SMQ, CMQ, etc.) from which the piece of selected hierarchical data was returned. Likewise, the source query set field 330 may be a data field which is updated by the provider computing system 104 to indicate the source query set from which the piece of selected hierarchical data was returned. For instance, as shown, the provider computing system 104 executed the query set ("custom query set 2) on the hierarchal data database 132. The query set, as shown in FIG. 4, includes two MedDRA queries including a first SMQ ("Accidents and Injuries") and a second SMQ ("hypersensitivity"). Accordingly, in response to returning the three matching pieces of hierarchical data, the provider computing system 104 may update the root query field 328 to indicate the root queries which included the three pieces of hierarchical data and the source query set field 330 to indicate the query set which included the root queries.

In some embodiments, the hierarchical data representations 318 may be populated by the provider computing system, based on the query sets of the query set section 334, as described with reference to steps 228-232 of the method 200. For instance, in response to receiving second hierarchical data, the provider computing system 104 may execute the query set on the hierarchical data database to select each piece of matching hierarchical data. The provider computing system 104 may then apply an expectedness of the queries to the hierarchical data and populate the hierarchical data section 316 with hierarchical data representations 318 for each matching piece of hierarchical data.

The query set section 334 provides the user of the user computing device 108 with an interface to review and manage query sets which are used to populate the datasheet of the datasheet page 300 with hierarchical data. In some embodiments, the query sets of the query set section 334 are datasheet query sets (as discussed with regard to the datasheet query set data object) which differs from the query set in that it includes an expectedness which is applied to the hierarchical data returned by the query set. As shown, the query set section 334 includes a create query set button 336 and one or more query set representations 338.

Each query set representation 338 may represent a specific (datasheet) query set and indicate whether each returned piece of hierarchical data for the query set is expected or unexpected. In the example shown, the datasheet of the datasheet 300 page includes a single datasheet query set ("Custom Query Set 2") in which each piece of hierarchical data is expected. As shown, each query set representation 338 includes a name field 340, a parent query set field 342, a scope field 344, and an expectedness field 346. In some embodiments, the query set representation further includes a seriousness exclusion field, an active start date field, and an active end date field (which may each be used for determining the expectedness of adverse events, as is discussed further in U.S. patent application Ser. No. 18/446,915 and U.S. patent application Ser. No. 17/691,751).

The name field 340 may be a selectable and editable text field through which the user of the user computing device 108 can initially set and/or edit the name of the datasheet query set of the query set representation 338, which may then be provided to the provider computing system 104 by the user computing device 108. In some embodiments, in response to selecting the name field 340, the user computing device 108 may be navigated to a datasheet query section (not shown) of a query set page 400. The datasheet query section may include data of the datasheet query as well as a reference to the parent query set (e.g., of the query set page 400). Likewise, the parent query set field 342 may be a selectable and editable text field through which the user of the user computing device 108 can initially set and/or edit the parent query set of the datasheet query set of the query set representation 338, which may then be provided to the provider computing system 104 by the user computing device 108. In this regard, the parent query set may be the query set which is used by the provider computing system 104 to select matching hierarchical data from the hierarchical data database 132 and populate the datasheet as discussed with steps 228-232 of the method 200. In some embodiments, in response to selecting the parent query set field 342, the user computing device 108 may be navigated to the query set page 400 associated with the parent query set.

The scope field 344 may be a selectable and editable data field through which the user of the user computing device 108 can initially set and/or edit the scope of the datasheet query set, which may then be provided to the provider computing system 104 by the user computing device 108. Scope is a term used by the MedDRA dictionary to define the scope of the query which can include a broad scope or a narrow scope. A narrow scope includes terms that are highly likely to represent the condition of interest, whereas a broad scope includes terms that may represent the condition of interest. For instance, the PTs Pancreatitis acute and Pancreatitis hemorrhagic are narrow terms for the SMQ Acute pancreatitis whereas PT Blood bilirubin increased is a broad term because not all instances of increased blood bilirubin are indicative of acute pancreatitis.

The expectedness field 346 may be an editable data field through which the user of the user computing device 108 can initially set and/or edit the expectedness of the datasheet query set of the query set representation 338, which may then be provided to the provider computing system 104 by the user computing device 108. For instance, the expectedness of the expectedness field 346 may be applied to or added to the matching hierarchical data returned from the hierarchical data repository. In one example, a datasheet query set may include the parent query set "custom query set 2", which may include two SMQs, and the expectedness of "expected". Accordingly, as discussed with regard to the method 200, the provider computing system 104 may execute the parent query set on the hierarchical data database 132 to return matching hierarchical data. Then, the provider computing system 104 may apply or add the expectedness of "expected" to each matching piece of hierarchical data before adding the matching hierarchical data to the datasheet.

The create query set button 336 may be a selectable button, that when selected, generates the create (datasheet) query set popup page 350. The create (datasheet) query set popup page 350 may be a popup page or section that includes multiple fields for generating a (datasheet) query set, which may be represented by a new query set representation 338. For instance, the create (datasheet) query set popup page 350 is shown to include a datasheet field 352, a parent query set field 354, a scope field 356, an expectedness field 358, a seriousness exclusion field 360, an active start date field 362, an active end date field 364, and a description field 366.

Each of the fields 352-366 may be for populating and initially setting the data of the datasheet query set, as described with reference to the query set representations 336. For instance, the parent query set field 354 may be substantially the same as the parent query set field 342 of the query set representation 338. In this regard, the user of the user computing device may populate one or more of the fields 352-366 with data and then select at least one of the save buttons 370. In response to selection of one of the save buttons 370, the user computing device 108 may generate a request to create a datasheet query set and provide the request to the provider computing system 104. The provider computing system 104 may receive the request and may generate a datasheet query set or datasheet query set data object, including the data from each of the fields 352-366. In comparison, if the user selects a cancel button 372, the user computing device 108 may discard the data of the fields 352-366 and close or hide the query set popup page 350.

Referring now to FIG. 4, the query set page 400 which can be displayed on a display of the I/O circuit 162 of the user computing device 108, is shown. In general, the query set page 400 provides the user an interface to setup and manage a specific set of queries. As shown, the query set page 400 includes a details section 404, a terms section 428, and a query or MedDRA building blocks section 430. To render or generate the query set page 400 on the user computing device 108, the provider computing system 104 may provide the query set including the query set data object as well as the queries and/or the query data objects of the query set to the user computing device 108 for display thereon. In this regard, it should be understood that each of the fields and/or sections of the query set page 400 may be data included in the query set data object. For instance, the query set page 400 is shown to include the terms section 428. In this regard, the query set object may include a reference to one or more pieces of hierarchical data (including terms therein).

The details section 404 provides the user of the user computing device 108 with an interface to review general data or details of the query set of the query set page 400. For instance, as shown, the details section 404 includes a name field 406, a level field 408, a hierarchical field 410, a description field 412, and a version field 414.

The name field 406 may be a modifiable and editable text field through which the user of the user computing device 108 can initially set and/or edit the name of the query set of the query set page 400, which may then be provided to the provider computing system 104 by the user computing device 108. Likewise, the description field 412 may be a modifiable and editable text field through which the user of the user computing device 108 can initially set and/or edit a description of the query set of the query set page 400, which may then be provided to the provider computing system 104 by the user computing device 108.

As described herein, each query set may be hierarchically structured such that a first query set may be associated with a first hierarchical classification, and a second query set may be associated with a second hierarchical classification, which is lower than the first hierarchical classification. In this regard, each of the level field 408 and the hierarchical field 410 may be data fields which describe the hierarchical characteristics of the query set of the query set page 400. For instance, the hierarchical field may be a Boolean or yes/no data field. When set to yes, the provider computing system 104 may consider the query set hierarchically-structured and allow for multiple levels or hierarchical classifications of query sets. In comparison, when set to no, the provider computing system 104 may not consider the query set hierarchically-structured. In this regard, the level field 408 may be a data field that includes the level or hierarchical classification of the query set where "1" may be the highest level or classification.

In one example, a first query set may be associated with a first hierarchical classification, a second query set may be associated with a second hierarchical classification, and a third query set may be associated with the second hierarchical classification. The second query set may include a first query and a second query; the third query may include a third query and a fourth query. The first query set may be the parent or higher-level query set of the second query set and the third query set. In this regard, when executing the first query set, the provider computing system 104 may select hierarchical data that matches anyone of the first query, the second query, the third query, and the fourth query. This structure may be repeated such that multiple levels or hierarchical classifications of the query sets are possible (e.g., a third level, a fourth level, etc.).

The version field 414 may be an editable data field through which the version of the query set of the query set page 400 may be included or identified. For instance, the provider computing system 104 may receive new hierarchical data and update the queries of the query set (e.g., by replacing the hierarchical data). In response, the provider computing system 104 may update the version field 414 from the old version (e.g., version 25.9) to the new version (version 26.0).

As shown, the terms section 420 includes multiple hierarchical data representations 428. Each hierarchical data representations 428 may represent a specific piece of hierarchical data (e.g., a MedDRA term or code). In the example shown, the query set of the query set page 400 includes three pieces of hierarchical data including the first MedDRA code 10081035, the second MedDRA code 10048799, and the third medDRA code 10001053.

Each hierarchical data representations 428 includes a name field 430, a term field 432, and a scope field 434. The name field 430 may be a text or data field that includes the name of the data object associated with the hierarchical data representation 428. Likewise, the term field 432 may be a text or data field that includes the term of the piece of hierarchical data associated with the respective hierarchical data representations 428. For instance, the first (top) term field 432 is shown to include the term "Acquired C1 inhibitor deficiency." Likewise, the scope field 434 may be a text or data field that includes the scope of the term of the hierarchical data representation 428 as it relates to the query from which the term was selected or provided. For instance, the first hierarchical data representations 428 is shown to include the scope field 434 ("narrow"). In this regard, the hierarchical data representations 428 may represent a piece of hierarchical data that is associated with the narrow scope of the query from which the piece of hierarchical data was selected (as compared to broad).

In some embodiments, each hierarchical data representations 428 may be selected or included in the terms section 420, in response to executing the query set of the query set page 400 (and the queries of the query section 430). For instance, the three hierarchical data representations 428 may be generated, and included therein, by the provider computing system 104, in response to executing each of the queries of the query section 430. In this regard, the hierarchical data of the terms section 428 may be the matching hierarchical data returned in response to executing the query set of the query set page 400.

As shown, the query section 430 includes multiple query representations 434 and a create query button 432. Through interaction with the query section 430, the user computing device 108 may add one or more queries to the query set of the query set page 400, which may then be provided to the provider computing system 104 in a request to generate a query set. For instance, via the query section 430, the user of the user computing device 108 may add multiple queries (as indicated by query representation 434) to the query set of the query set page 400. Then, in response to saving the query set or selecting a save button (not shown), the user computing device 108 may generate a request to generate a query set including each of the queries of the query section 430. To add a query to the query set, the user of the user computing device 108 may select the create button 432. When selected, the query set page 400 may display a create query popup page or section (not shown). To do so, the provider computing system 104 may provide a list of each query included in the query database (134), which then may be displayed in the create query popup page. The user may then select one of the queries of the listing, which may then be added to the query section 430.

Each query representation 434 may represent a specific query (e.g., an SMQ, a CMQ, etc.). In the example shown, the query set of the query set page 400 includes two queries including a first SMQ and a second SMQ. Further, each query representation may include a name field 436 and a query field 438.

The name field 436 may be a text or data field that includes the name of the data object associated with the query representation 434. Likewise, the query field 438 may be a text or data field that includes query of the query representation 434. In some embodiments, the query field 438 may be a selectable field that, when selected, navigates the user computing device 108 to a query page (not shown).

Figure 5:
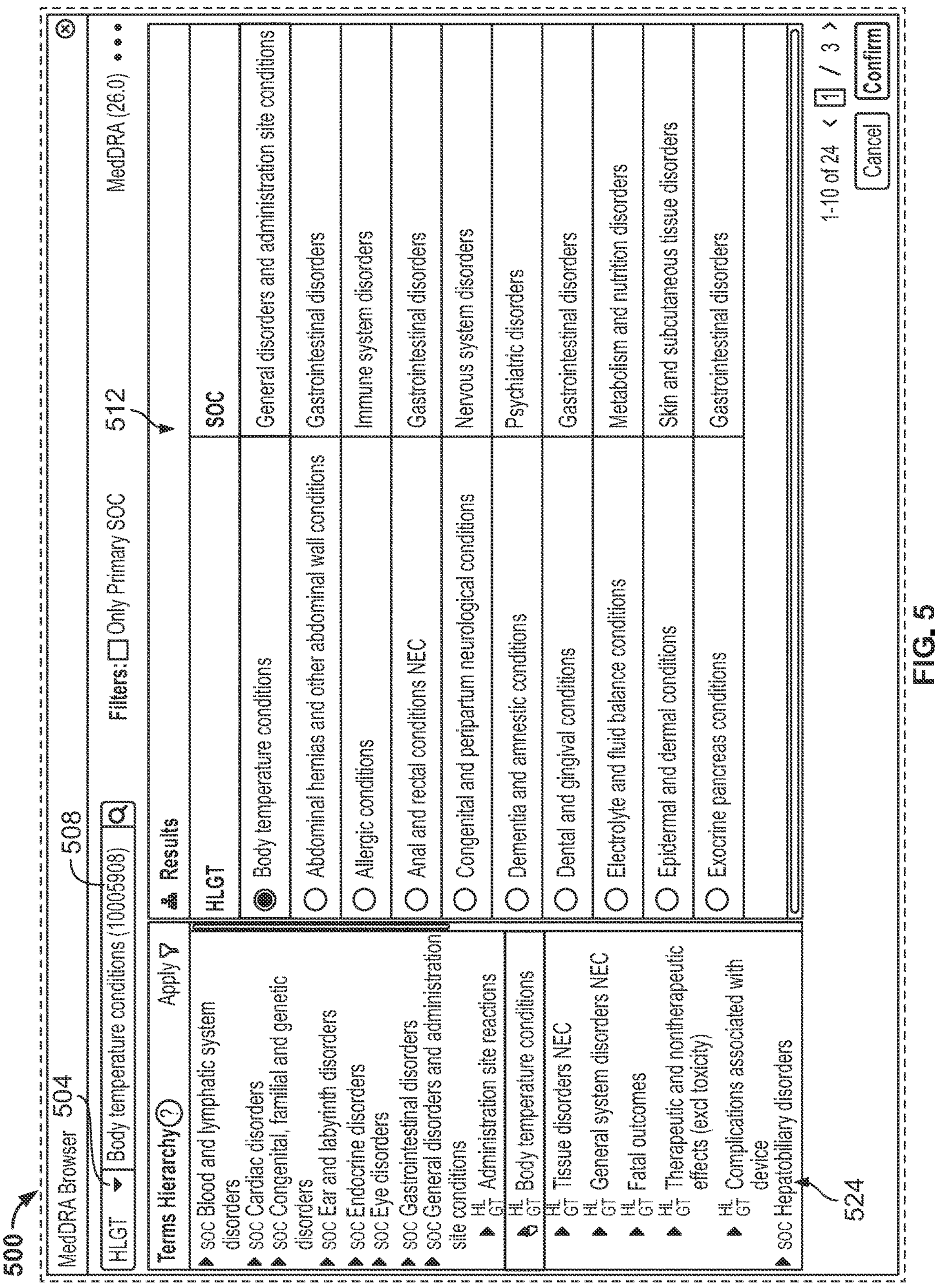
FIG. 5 may be an illustration of some aspects of a user interface generated by the hierarchical data system of FIG. 1 to select hierarchically-structured data, according to an example embodiment.

Referring now to FIG. 5, a MedDRA browser page 500 which can be displayed on a display of the I/O circuit 162 of the user computing device 108, is shown. In general, the MedDRA browser page 500 provides the user an interface to browse for and select a specific medDRA term. As shown, the MedDRA browser page 500 includes a hierarchy selection drop-down box 504, a search box 508, a results section 512, and a hierarchy explorer section 524. To render or generate the MedDRA browser page 500 on the user computing device 108, the provider computing system 104 may provide the most recent version of the hierarchical version data object (or data thereof) including the hierarchical data object (or data thereof) to the user computing device 108 for display thereon.

The hierarchy selection drop-down box 504 and the search box 508 may work in tandem and may be data fields through which the user of the user computing device 108 can select a specific hierarchy level or classification (e.g., via the hierarchy selection drop-down box 504,) as well a specific term or code (e.g., via the search box 508). The user of the user computing device 108 may then select a search button (not shown), which may cause the user computing device 108 to send a hierarchical data request to the provider computing system 104. The provider computing system 104 may search or query the hierarchical data database 132 for hierarchical data matching the hierarchical classification and term or code, and provide the matching hierarchical data to the user computing device 108. The matching hierarchical data may then be displayed in the results section 512.

Similarly, the hierarchy explorer section 524 may be a manually-searchable section through which the user of the user computing device 108 can search the MedDRA hierarchy. For instance, starting at the highest-level, the SOC, the user computing device 108 may expand the class to display the lower-level HLGT. This process may be repeated until reaching the lowest level, the LLT.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for querying hierarchical data from a first database comprising:

receiving, by a provider computing system, first hierarchical data associated with a first version;

storing, by the provider computing system, the first hierarchical data in the first database of the provider computing system;

receiving, by the provider computing system, a request to generate a first query set data object associated with a query set including a first query and a second query, wherein the first query is a first query type and the second query is a second query type;

generating, by the provider computing system, the first query set data object, wherein the first query set data object is structured according to a hierarchical query schema and comprises:

a name field for storing a name of the first query set;

at least one datasheet query set data object that depends from the first query set data object, the datasheet query set data object comprising:

an expectedness field for storing an expectedness value; and a datasheet data object; and at least one query data object that depends from the first query set data object, the at least one query data object comprising:

a structured query data object comprising:

at least one first hierarchical data object for storing a piece of hierarchical data; or a custom query data object comprising:

at least one second hierarchical data object for storing a piece of hierarchical data;

generating, by the provider computing system, a first structured query data object associated with the first query;

adding, by the provider computing system, the first structured query data object to the at least one query data object of the first query set data object;

generating, by the provider computing system, a second custom query data object associated with the second query;

adding, by the provider computing system, the second custom query data object to the at least one query data object of the first query set data object;

receiving, by the provider computing system, second hierarchical data associated with a second version;

storing, by the provider computing system, the second hierarchical data in the first database of the provider computing system;

executing, by the provider computing system and in response to storing the second hierarchical data in the first database, the first query and the second query of the query set on the first database to select matching hierarchical data;

selecting, by the provider computing system, a datasheet from a second database of the provider computing system, the datasheet including outmoded hierarchical data;

replacing, by the provider computing system, the outmoded hierarchical data of the datasheet with the matching hierarchical data; and storing, by the provider computing system, the datasheet including the matching hierarchical data in the second database.

2. The method of claim 1, wherein the first query type is a standardized query type, and wherein receiving the first hierarchical data comprises:

receiving a first data package including the first hierarchical data and a first plurality of standardized queries including the first query, wherein each standardized query includes one or more pieces of the first hierarchical data and the standardized query type, and wherein the first plurality of standardized queries is associated with the first version.

3. The method of claim 2, wherein receiving the second hierarchical data comprises:

receiving a second data package including the second hierarchical data and a second plurality of standardized queries including a third query, wherein each standardized query of the second plurality of standardized queries includes one or more pieces of the second hierarchical data and the standardized query type, and wherein the third query is a new version of the first query; and replacing, by the provider computing system, the first query of the query set with the third query.

4. The method of claim 1, wherein the second query type is a custom query type, and wherein the method further comprises:

receiving, by the provider computing system, a request to generate the second query from a user computing device, the request identifying at least two pieces of the first hierarchical data; and generating, by the provider computing system, the second query including the at least two pieces of the first hierarchical data.

5. The method of claim 1, wherein the first query type is a standardized query type and the second query type is a custom query type, wherein the first query includes at least one piece of the first hierarchical data associated with a first hierarchical classification or a second hierarchical classification, and wherein the second query includes at least one piece of the first hierarchical data associated with a third hierarchical classification, and wherein the third hierarchical classification is a higher classification than the first hierarchical classification and the second hierarchical classification.

6. The method of claim 5, wherein the hierarchical data includes a MedDRA term, wherein the first hierarchical classification is a lowest level term (LLT) classification, the second hierarchical classification is a preferred term (PT) classification, and the third hierarchical classification is at least one of: a high-level group term (HLGT) classification, a high-level (HL) classification, or a system organ class (SOC) classification.

7. The method of claim 1, further comprising:

adding, by the provider computing system, an expectedness to the matching hierarchical data to generate combination hierarchical data, wherein the provider computing system replaces the outmoded hierarchical data with the combination hierarchical data.

8. The method of claim 1, wherein the provider computing system selects the datasheet from the second database in response to a first datasheet query set data object of the first query set data object including the first datasheet data object.

9. A provider computing system for querying hierarchical data, the provider computing system comprising:
a first database for storing hierarchical data;
a second database for storing a datasheet;
a network interface configured to facilitate data communication via a network; and
a processing circuit comprising a processor and a memory, the processing circuit configured to:
receive, via the network interface, first hierarchical data associated with a first version;
store the first hierarchical data in the first database;
receive, via the network interface, a request to generate a first query set data object associated with a query set including a first query and a second query,
wherein the first query is a first query type and the second query is a second query type;
generate the first query set data object,
wherein the first query set data object is structured according to hierarchical query schema and comprises:
a name field for storing a name of the first query set;
at least one datasheet query set data object that depends from the first query set data object, the datasheet query set data object comprising:
an expectedness field for storing an expectedness value; and
a datasheet data object; and
at least one query data object that depends from the first query set data object, the at least one query data object comprising:
a structured query data object comprising:
at least one first hierarchical data object for storing a piece of hierarchical data; or
a custom query data object comprising:
at least one second hierarchical data object for storing a piece of hierarchical data;
generate a first structured query data object associated with the first query;
add the first structured query data object to the at least one query data object of the first query set data object;
generate a second custom query data object associated with the second query;
add the second custom query data object to the at least one query data object of the first query set data object;
receive, via the network interface, second hierarchical data associated with a second version;
store the second hierarchical data in the first database;
execute, in response to storing the second hierarchical data in the first database, the first query and the second query of the query set on the first database to select matching hierarchical data;
select the datasheet from the second database, the datasheet including outmoded hierarchical data;
replace the outmoded hierarchical data of the datasheet with the matching hierarchical data; and
store the datasheet including the matching hierarchical data in the second database.

10. The provider computing system of claim 9, wherein the first query type is a standardized query type, and wherein receiving the first hierarchical data comprises:
receiving, via the network interface, a first data package including the first hierarchical data and a first plurality of standardized queries including the first query,
wherein each standardized query includes one or more pieces of the first hierarchical data and the standardized query type, and wherein the first plurality of standardized queries is associated with the first version.

11. The provider computing system of claim 10, wherein receiving the second hierarchical data comprises:
receiving, via the network interface, a second data package including the second hierarchical data and a second plurality of standardized queries including a third query,
wherein each standardized query of the second plurality of standardized queries includes one or more pieces of the second hierarchical data and the standardized query type, and wherein the third query is a new version of the first query; and
replacing the first query of the query set with the third query.

12. The provider computing system of claim 9, wherein the second query type is a custom query type, and wherein the processing circuit is further configured to:
receive, via the network interface, a request to generate the second query from a user computing device, the request identifying at least two pieces of the first hierarchical data; and
generate the second query including the at least two pieces of the first hierarchical data.

13. The provider computing system of claim 9, wherein the first query type is a standardized query type and the second query type is a custom query type, wherein the first query includes at least one piece of the first hierarchical data associated with a first hierarchical classification or a second hierarchical classification, and wherein the second query includes at least one piece of the first hierarchical data associated with a third hierarchical classification, and wherein the third hierarchical classification is a higher classification than the first hierarchical classification and the second hierarchical classification.

14. The provider computing system of claim 9, wherein the hierarchical data includes a MedDRA term, wherein the first hierarchical classification is a lowest level term (LLT) classification, the second hierarchical classification is a preferred term (PT) classification, and the third hierarchical classification is at least one of: a high-level group term (HLGT) classification, a high-level (HL) classification, or a system organ class (SOC) classification.

15. The provider computing system of claim 9, wherein the processing circuit is further configured to:
add expectedness to the matching hierarchical data to generate combination hierarchical data,
wherein the provider computing system replaces the outmoded hierarchical data with the combination hierarchical data.

16. The provider computing system of claim 9, wherein the processing circuit is configured to select the datasheet from the second database in response to a first datasheet query set data object of the first query set data object including the first datasheet data object.

* * * * *